United States Patent [19]

Norman

[11] Patent Number: 4,826,517
[45] Date of Patent: May 2, 1989

[54] DISPOSABLE AIR CLEANER WITH ONE PIECE HOUSING

[75] Inventor: Peter J. Norman, Chatham, Canada

[73] Assignee: Bendix Electronics Limited, Chatham, Canada

[21] Appl. No.: 188,249

[22] Filed: Apr. 29, 1988

[51] Int. Cl.⁴ .................. B01D 29/04; B01D 46/10
[52] U.S. Cl. .................................. 55/418; 55/502; 55/511; 55/DIG. 28; 264/515; 264/516
[58] Field of Search ............... 55/418, 495–504, 55/509, 511, 521, DIG. 28; 264/515, 516; 425/531, 532, 535, 536, 538

[56] References Cited

U.S. PATENT DOCUMENTS

| | | | |
|---|---|---|---|
| 3,281,283 | 10/1966 | Ralph | 264/516 X |
| 3,424,623 | 1/1969 | Oakley et al. | 264/516 X |
| 3,681,898 | 8/1972 | Hopkins et al. | 55/487 |
| 3,686,837 | 8/1972 | Hopkins et al. | 55/487 |
| 3,693,410 | 9/1972 | Robrecht et al. | 55/511 X |
| 3,712,033 | 1/1973 | Gronholz | 55/511 X |
| 3,772,858 | 11/1973 | Klugman | 55/504 X |
| 3,778,985 | 12/1973 | Daigle et al. | 55/511 X |
| 3,827,130 | 8/1974 | Baumann | 264/516 X |
| 4,133,661 | 1/1979 | Strnad | 55/511 X |
| 4,148,732 | 4/1979 | Burrow et al. | 55/502 X |
| 4,404,006 | 9/1983 | Williams et al. | 55/511 X |
| 4,619,677 | 10/1986 | Matheson et al. | 55/498 X |
| 4,636,231 | 1/1987 | Thornton et al. | 55/497 X |
| 4,657,570 | 4/1987 | Gronholz et al. | 55/511 X |
| 4,673,363 | 6/1987 | Hudson et al. | 264/516 X |
| 4,692,177 | 9/1987 | Wright et al. | 55/511 X |
| 4,701,197 | 10/1987 | Thornton et al. | 55/487 |
| 4,713,097 | 12/1987 | Grani et al. | 55/497 X |
| 4,719,072 | 1/1988 | Kojima et al. | 264/515 |
| 4,725,296 | 2/1988 | Kurotobi | 55/497 |

FOREIGN PATENT DOCUMENTS

| | | | |
|---|---|---|---|
| 1930948 | 12/1970 | Fed. Rep. of Germany | 264/515 |
| 51333 | 5/1981 | Japan | 264/516 |
| 56827 | 4/1983 | Japan | 264/515 |
| 118435 | 7/1984 | Japan | 264/515 |
| 89824 | 5/1986 | Japan | 264/516 |
| 495369 | 11/1938 | United Kingdom | 55/511 |
| 2150461 | 7/1985 | United Kingdom | 55/497 |
| 2155355 | 9/1985 | United Kingdom | 55/497 |
| 2179872 | 3/1987 | United Kingdom | 55/497 |

Primary Examiner—Robert Spitzer
Attorney, Agent, or Firm—Russel C. Wells

[57] ABSTRACT

An air cleaner and method of making same, the air cleaner comprises: a one piece, moulded housing, including domed first and second outer portions integrally formed about a common circumferential first edge, defining therein a chamber, an inlet and an outlet extending therefrom in communication with the chamber. A panel filter is secured within the housing, during the moulding thereof, at the common edge for dividing the chamber into first and second aerodynamically shaped compartments in communication with the inlet and outlet respectively.

22 Claims, 4 Drawing Sheets

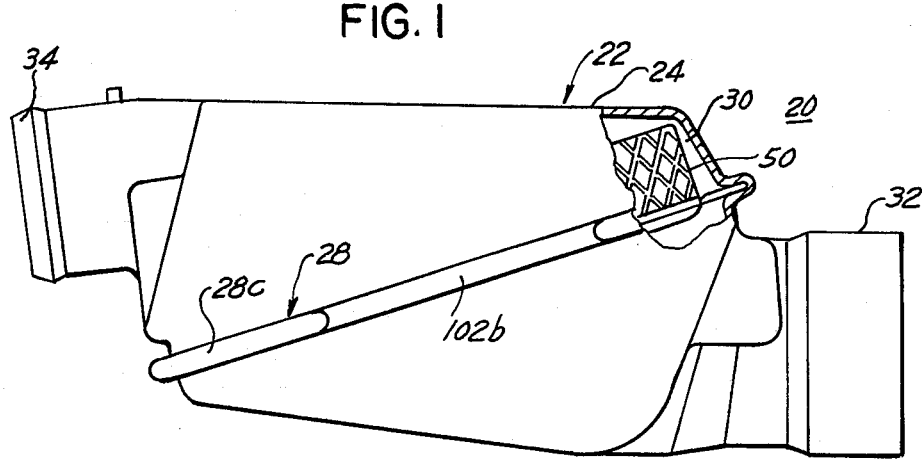
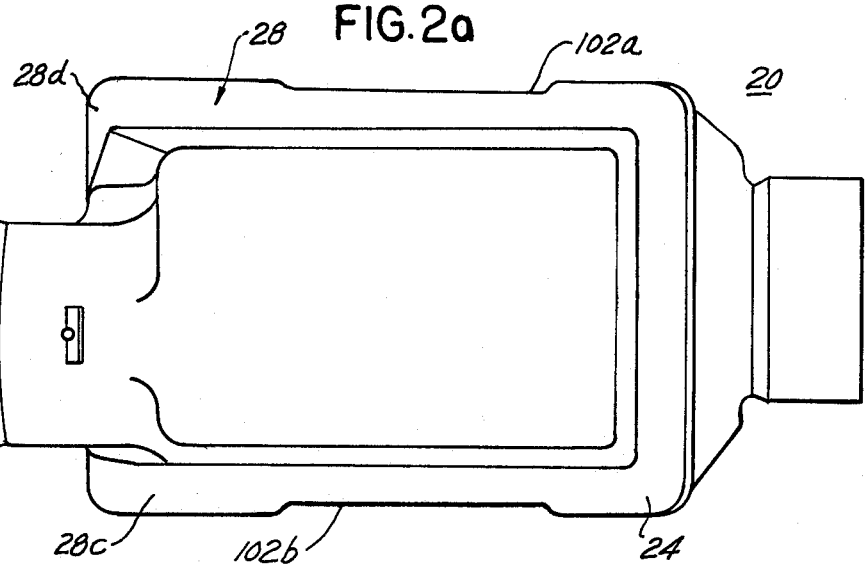
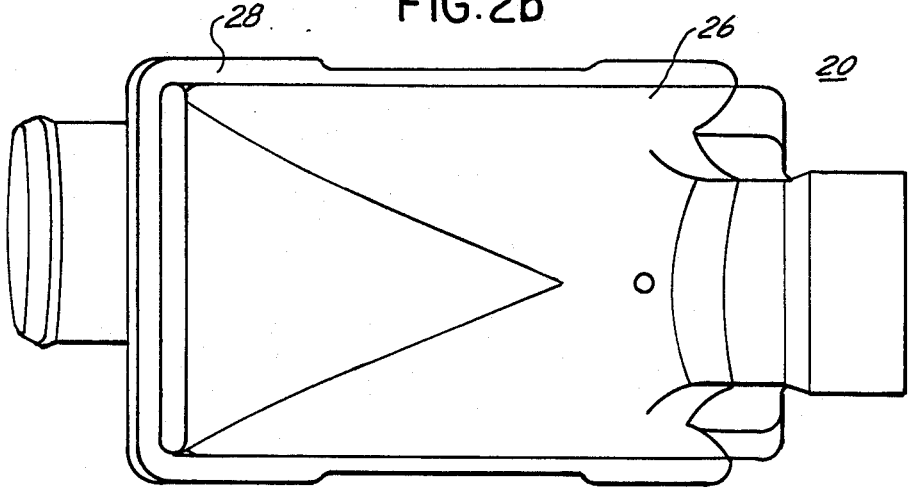

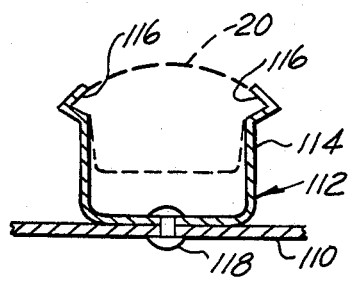
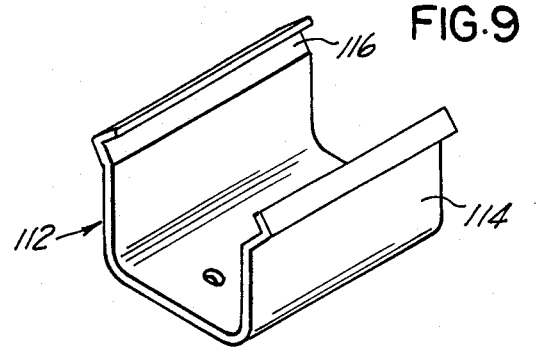
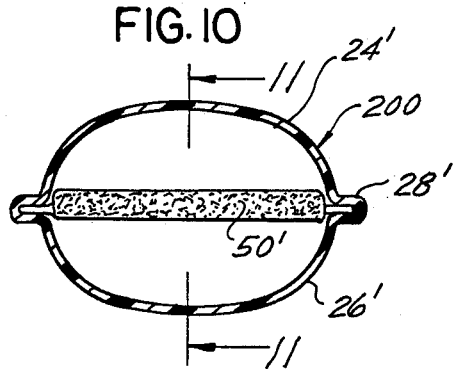
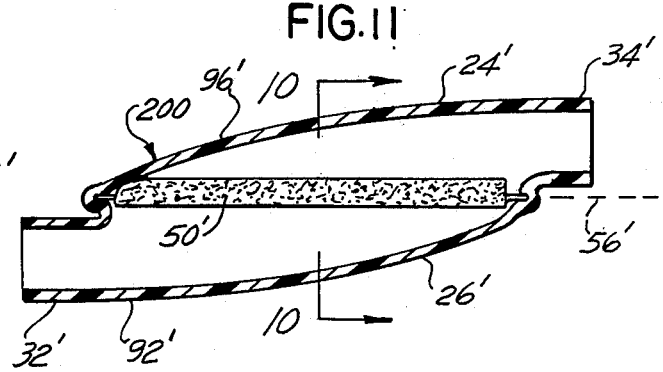
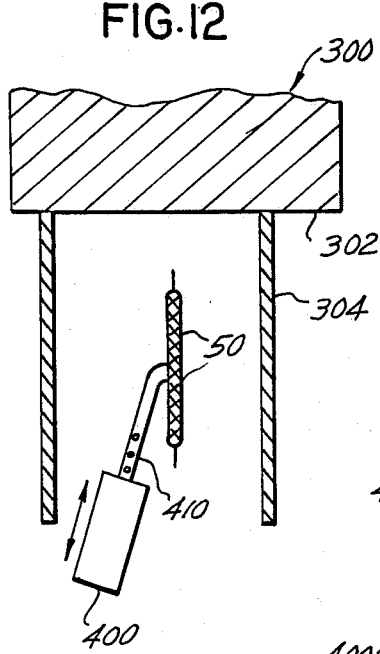
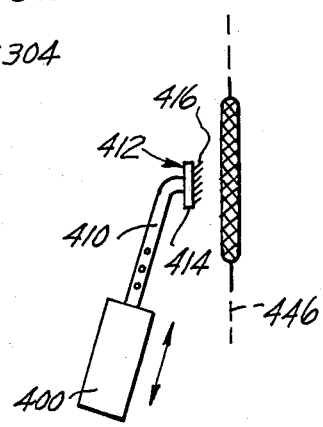
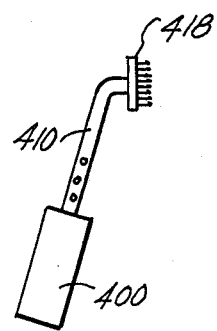

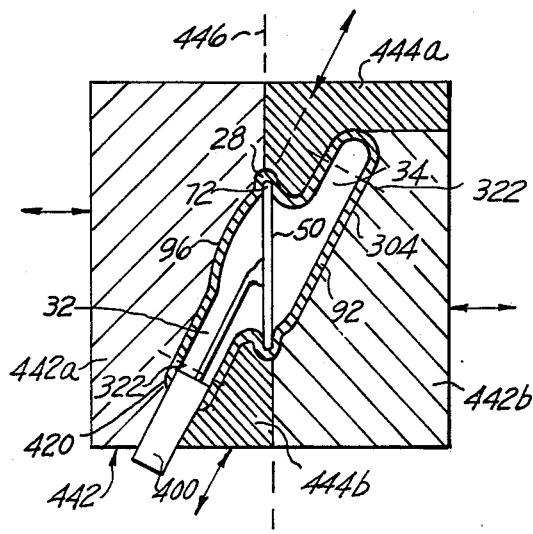
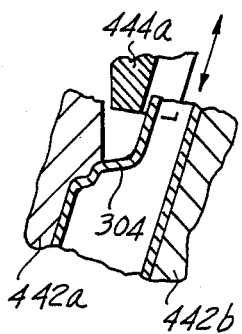
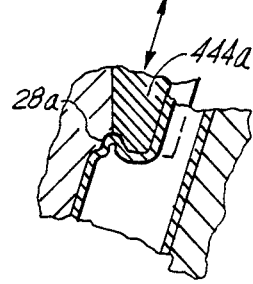
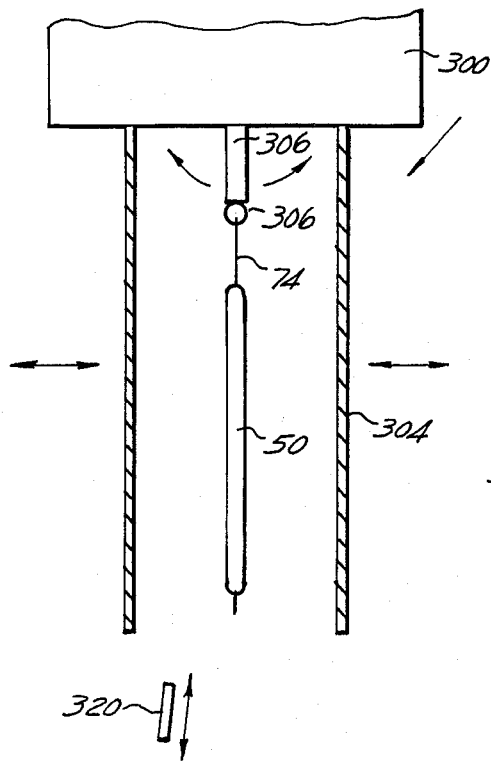
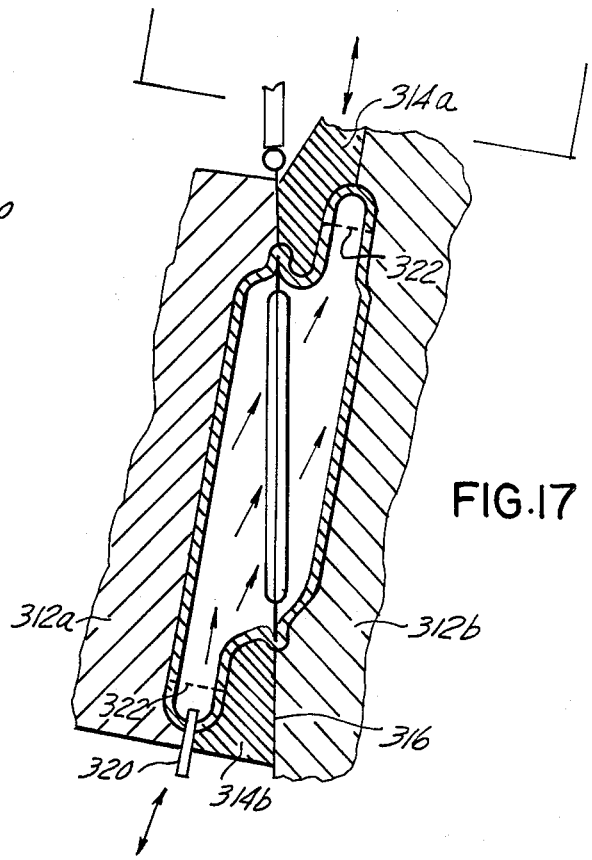

DISPOSABLE AIR CLEANER WITH ONE PIECE HOUSING

BACKGROUND AND SUMMARY OF THE INVENTION

The present invention relates generally to air cleaners and more particularly to an axial flow disposable air cleaner having a one-piece housing formed by blow moulding.

Air cleaners or filters, filter the inlet air to the engine. These filters or cleaners often comprise multipart assemblies which are often relatively expensive and susceptible to leakage caused by the accumulation of tolerances when several components are used. Conventional air cleaners include flat, round or cylindrical filter cartridges secured in a lower housing section and held securely therein by a separate or hinged cover. The filter cartridge is generally sealed about its periphery by screwing or clamping the cover into place. All of these parts accumulate tolerances creating a maximum or minimum material condition directly affecting the compression on the sealing edge of the cartridge or filter. The effectiveness of the air filter may deteriorate because of the aging of the seal material, such as rubber, or urethane. During the maintenance of these prior filters, when the filter element is removed from the housing the seals may be broken or alternatively dirt may be lodged between the filter seal and the housing thereby reducing its effectiveness.

It is an object of the present invention to provide an air cleaner of simple form and construction and at the same time eliminate most of the weaknesses inherent in the prior art. A further object of the present invention is to provide an air filter formed of a Plastic blow moulded skin or housing enclosing a moulded fibrous material filter panel. A further object of the present invention is to provide an air filter devoid of rubber and urethane seals. A further object of the present invention is to provide a filter having an updraft flow path to minimize the retention of heavy dirt particles in the filter panel.

Accordingly the invention comprises: an air cleaner comprising: a single piece blow moulded housing defining a central chamber and an inlet and an outlet communicated thereto and an air filter element dividing the central chamber into first and second compartments in communication with the inlet and outlet respectively, secured to the housing during the moulding thereof. More specifically, the invention includes an air cleaner comprising: a one piece, moulded housing, including aerodynamically domed first and second outer portions integrally formed about a common circumferential first edge, defining therein the chamber and an inlet and an outlet extending therefrom. A panel filter is secured within the housing, during the moulding thereof, at the common first edge and divides the chamber into first and second compartments in communication with the inlet and outlet respectively. The first and second compartments are aerodynamically shaped to reduce turbulence and to enhance the uniformity of the velocity of the air flow through the filter element. A method of producing the air cleaner is also described.

Many other objects and purposes of the invention will be clear from the following detailed description of the drawings.

BRIEF DESCRIPTION OF THE DRAWINGS

In the drawings:

FIG. 1 is a front view of an air filter.

FIGS. 2a and 2b are top and bottom views of an air cleaner.

FIGS. 8 and 9 illustrate a bracket for attaching the air cleaner to a vehicle body panel.

FIG. 10 illustrates an end view of an alternate embodiment of the invention taken along line 10—10 of FIG. 11.

FIG. 11 illustrates a cross-sectional view taken through section 11—11 of FIG. 10.

FIG. 12 illustrates a blow moulding machine for fabricating an air cleaner.

FIGS. 13a and 13b illustrate a fixture for holding a filter element in a blow molding machine.

FIG. 14 illustrates a moulded air filter element positioned within the blow moulding machine.

FIGS. 15a and 15b illustrate the movement of the slides or secondary moulds of various process steps in the manufacture of an air cleaner.

FIG. 16 illustrates one of the initial steps in an alternate moulding process.

FIG. 17 illustrates a moulded air cleaner positioned within the blow moulding machine of FIG. 16.

DETAILED DESCRIPTION OF THE DRAWINGS

Figure 4:
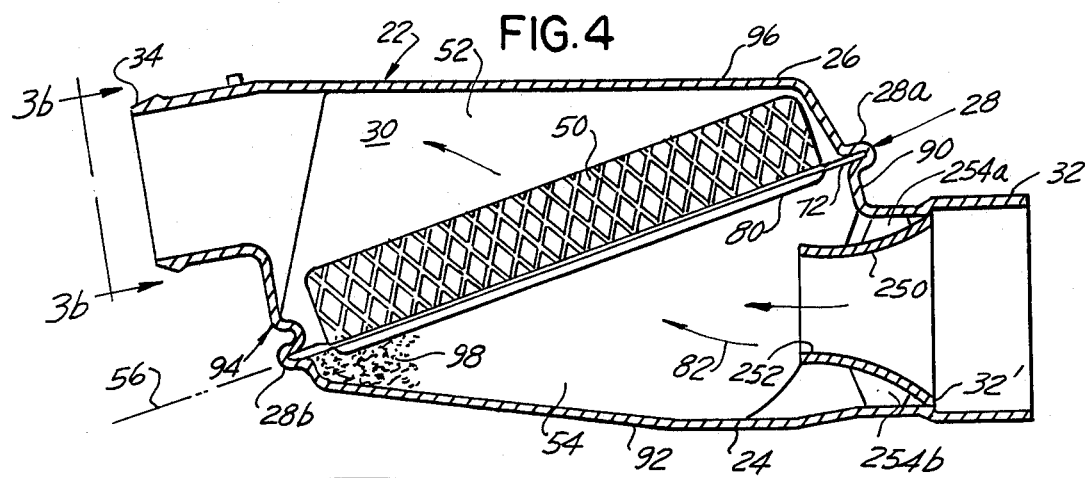
FIG. 4 is a cross-sectional view of the filters shown in FIGS. 1 and 2.

FIGS. 1 through 4 illustrate various views of an air cleaner 20. The air cleaner comprises a single piece blow moulded housing generally shown as 22 comprising first and second substantially identical first and second housing portions 24 and 26 which are integrally formed about a common joint or edge 28. The first and second housing portions 24 and 26 cooperatively form an interior chamber 30. The housing portions 24 and 26 further include a respective inlet 32 and outlet 34 in communication with the chamber 30. A substantially rectangular filter panel 50 (see FIG. 5) is secured to the housing 22 within the chamber 30. The filter element 50 subdivides the chamber into first and second compartments 52 and 54 respectively.

Figure 5:
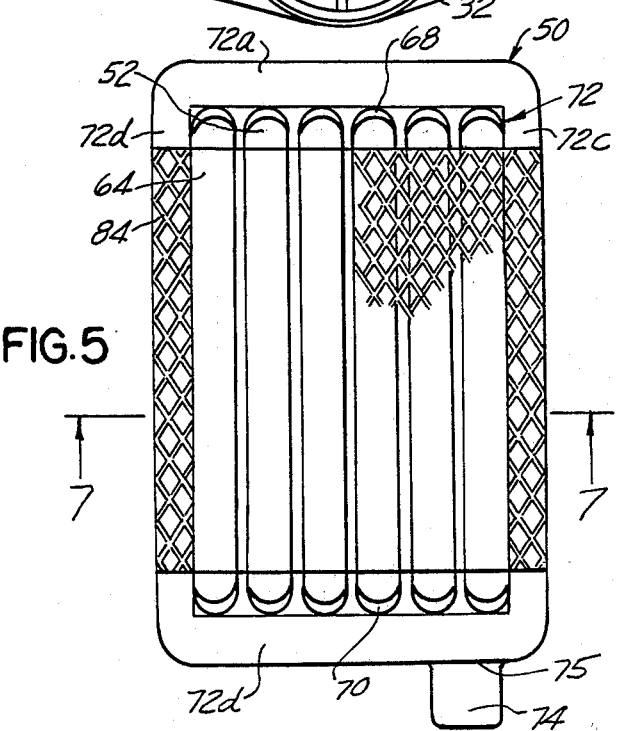
FIG. 5 is a top view of a filter element.
Figure 6:
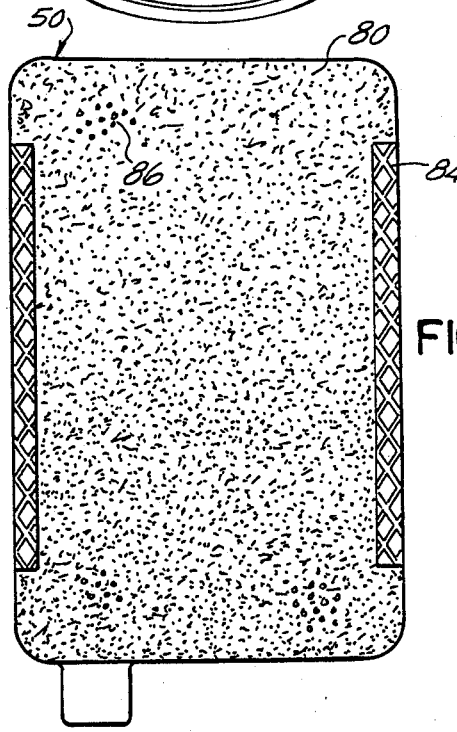
FIG. 6 is a bottom view of the filter element of FIG. 5.
Figure 7:
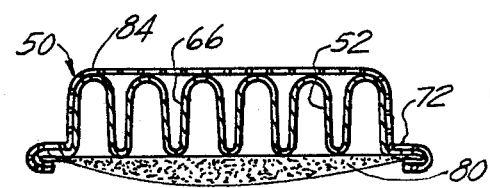
FIG. 7 is the cross-sectional view of a filter element taken along line 7—7 of FIG. 5.

The air cleaner 20 is of the axial flow variety, that is the inlet 32 and outlet 34 are disposed essentially colinearly about an axis 56. In the preferred embodiment of the invention, the filter element or panel 50 is substantially rectangular in shape. Other shapes of the filter panel are similarly within the scope of the present invention. The filter panel is illustrated in FIGS. 5-7. One such filter panel is shown in U.S. Pat. No. 4,701,197, owned by the parent company of the assignee of the present invention. Such patent is incorporated herein by reference. The filter element 50 comprises a center core formed by a mouldable porous resin material 53 presently used in air cleaners. The material 53 may be formed with a plurality of axially extending, substantially hollow, fluted ribs 64. The ribs 64, along their axial dimension, are integrally joined by an axially extending middle portion 66 of the filter material. Each rib 64 is formed with closed ends 68 and 70 respectively. A substantially flat portion or circumferential edge 72 surrounds the ribbed portion of the filter element 50. The edge 72 may further include a flat tab 74 the purpose of which will be discussed below. A fibrous bat material 80 is secured to the middle portions 66 and to the edge 72. The bat material is preferably oriented relative to the air flow shown by arrow 82 (see FIG. 4) to receive unfiltered air. The filter element 50 may further include an optional, flexible wire mesh 84 disposed about the downstream surfaces of the ribs 64 and extends or is wrapped about the upstream side of the edge 72. The mesh 84 is useful to provide additional rigidity to the fibrous material 53. As illustrated in FIG. 5, the mesh need not envelope all four sides of the edge 72 or the entire length of the ribs 64. As illustrated therein, the mesh envelopes only sides 72c and 72d. Additionally the filter element 50 may further include a pre-screen 86, shown in FIG. 6 secured across the batting material 80. Such pre-screen 86 is not illustrated in FIG. 7.

A shortcoming of many prior air filters is that the air flow through the filter element is not uniform and as such only a relatively small portion of the filter element performs the filtering function at any given time. The primary reason for this shortcoming is that the pressure differential or flow distribution through the filter is nonuniform such that the incoming air will always take the path of least resistance. The result of the nonuniform air distribution is often seen as clogged portions of the filter element. To enhance the flow distribution through the filter element prior air cleaners resort to using baffles to distribute air to and through the filter element. In contrast the present invention provides for a uniform flow distribution through the filter element 50 by configuring the shape of the first and second housing portions 24 and 26 respectively and by orienting the filter panel 50 such that the compartments 52 and 54 are aerodynamically shaped. This shaping reduces air turbulance which inherently restricts airflow thereby providing for a uniform flow distribution and pressure drop across the filter element 50. With reference to FIG. 4, the second housing element 26 includes an end 90 defining the inlet 32. The end surface 90, proximate the inlet 32, transitions smoothly toward the integrally shaped edge 28 at 28a. The second housing member 26 further includes a bottom or outer surface 92, which extends forward of the end surface 90, and which may taper downwardly from proximate the inlet 32 to an opposite side 28b of the edge 28. Similarly, the first housing member 24 includes an end surface 94 defining the outlet 34 which transitions to the integrally shaped edge side 28b. The first housing member further includes a top or outer portion 96 which tapers rearwardly from the outlet 34 to the edge side 28a. The tapering outer portions 92 and 96, in cooperation with the orientation of the filter element 50, define the aerodynamically shaped first and second compartments. As can be seen, the cross-sectional area of the second compartment 54 decreases from the inlet 32 to the attachment of the outer portion 92 to the edge side 28b while the cross-sectional area of the first compartment increases. The corresponding reduction in the flow area of the first compartment and the corresponding increase in the flow area of the second compartment provides for an incremental increase in the air flow across the filter from the large flow area, near the inlet, to the restricted flow area proximate the edge side 28b. In addition, the tapered or aerodynamically profiled second compartment 54 prevents the formation of turbulance which may occur near its narrowed end. Similarly, as mentioned above, the first compartment 52 defines a smaller or narrowed flow area beginning at the upstream portion proximate the side 28a and increases toward the outlet 34. The aerodynamically shaped outer Portion 96 prevents the creation of turbulant flow at the narrowed end of the compartment 52 proximate the side 28a. It should be noted that the cross-sectional area taken perpendicular to the axis 56, across both the first and second compartments 52 and 54, is substantially identical along the length of the filter element 50.

Figure 3A:
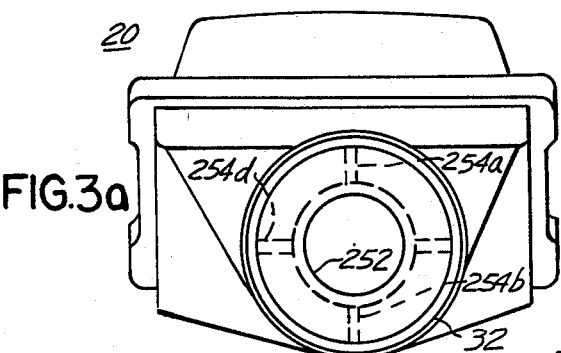
FIG. 3a is a right side elevational view of the above air filter and FIG. 3b is a left side plan view of an outlet taken in the direction of line 3b—3b of FIG. 4.
Figure 3B:
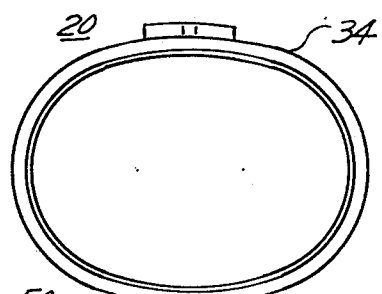

FIGS. 3a and 4 also illustrate an optional feature of the present invention comprising an inlet orifice 250 including an inlet opening 32' of substantially the same size as the inlet 32 and a narrowed exit opening 252 extending into compartment 54. The inlet orifice 252 may be supported relative to the housing by ribs 254a, –254b.

As can be seen from the above FIGURES, the preferred embodiment of the invention orients the filter panel 50 relative to axis 56. Other orientations, as described below, are similarly within the scope of the present invention. In addition, the present invention is configured such that inlet air (see arrow 82) must flow upwardly through the filter panel 50. This orientation yields an additional advantage in that the larger particles of dirt 98 in the unfiltered incoming air will impact the fiberous bat 80 and thereafter will fall to the bottom of the second compartment 54 and perhaps be pushed to the narrow end so as not to deterorate the operation of the filter element 50.

As can be seen from FIG. 2a, the circumferential edge 28 includes opposing recesses 102a and 102b formed about the sides 28c and 28d of the edge 28. These recesses 102 are formed during the molding process. These recesses are also optional in the present invention but are useful if the air cleaner 20 is to be mounted as described below. FIGS. 8 and 9 illustrate one means of attaching the air cleaner 20 to the vehicle such as to a vehicle body panel 110. FIGS. 8 and 9 illustrate a bracket generally shown as 112 comprising flexible walls 114 which include axially directed grooves 116. The bracket 112 is adapted to be fastened to the vehicle body panel 110 by a securement generally illustrated as 118. Such securement may comprise a rubber, plastic, or metal rivet, bolts or screws as may be known to the art. The air cleaner, shown (diagramatically) in dotted line in FIG. 8, is inserted into the grooves 116 which secure it in place. Alternatively, since the air cleaner 20 is relatively compact and streamlined in design, it may be fixed in place to various inlet and outlet tubing (not shown) that may be attached to the inlet and outlets 32 and 34 respectively.

FIGS. 10 and 11 illustrate an alternate embodiment of the present invention. FIGS. 10 and 11 illustrate an air cleaner 200 which is substantially similar to the air cleaner 20 illustrated in the above FIGURES. The air cleaner 200 comprises first and second housing members 24' and 26' defining respectively an inlet 32' and an outlet 34'. The housing members 24' and 26' are joined together at an integrally formed circumferential edge 28' which is substantially colinear to an axis 56'. The inlet 32' and outlet 34' are also similarly coaxial to the axis 56'. The filter element 50' is oriented along the axis 56'. To achieve the aerodynamic shaping of the first and second compartments 50' and 54', the profile of the respective outer portions 92' and 96' is more markedly curved than illustrated in the above FIGURES.

It is contemplated that the above described air cleaners may be manufactured as follows:

FIGS. 12-14 illustrate a blow moulding machine 300. Neither the machine 300, nor the various moulds which form a part thereof, are described in exacting detail since such machines and the method of making moulds are felt to be well known in the art. The blow moulding machine 300 includes an extrusion die 302 of known variety. Situated below the extrusion die 302, is a movable robotic arm 400. The arm 400 (also shown in FIG. 13a) may include an injection pin 410. Situated atop the robotic arm is a filter element holder generally shown as 412. The filter element holder may include a base 414 oriented such that when the filter element 50 is secured thereto, the filter will lie along the mating or separation line 446 of a multi-part mould 442. It should be recalled that the filter element 50 includes on one side thereof a fibrous bat 80. As such the base 414 includes means for securing the filter element 50 thereto. Such means may comprise a plurality of pins 416 adapted to extend through the fibrous bat 80 thereby securing it in place. Alternatively, as illustrated in FIG. 13b the base may include a pad of Velcro material 418 which will engage the fibrous bat thereby similarly securing same to the base 414. In the above embodiment the filter element 50 would not include the tab 74 shown in FIG. 5.

FIG. 12 diagramatically illustrates the robot arm 400 with the filter element 50 in place and positioned within the cylindrically shaped curtain 304 (parison) of plastic such as polypropylene formed by the extrusion die 302. In FIG. 14 the various mould portions have been moved into place in a conventional manner and air has been injected into the parison 304 thereby blowing the parison into the various mould cavities. More specifically, the mould may include a plurality of movable portions comprising radially moving portions such as matched female mould 442a and 442b and the axiallY movable portions 444a and 444b. The female moulds 442a and 442b are formed with internal cavities to form the outer surfaces 92 and 96 of the housing portions 26 and 24 resPectively as well as a portion of the inlet 32 and outlet 34. In addition, these moulds in mating engagement form portions of edge 28 (28c and d) which is formed tightly about the edge 72 of the filter element 50. As mentioned above, the filter element 50 is preferrably oriented by the base 414. Thereafter, the mould portions 442a and 442b are moved together. Simultaneously, with the mating of the radially movable mould portions 442a and 442b pressurized air is communicated to the injection pin 410 to blow the unformed parison into the various mould cavities. Thereafter, axially movable mould portions 444a and 444b are slid into place forming the configuration illustrated in FIG. 14. The axially movable mould portions 444a and 444b further shape the parison to form the remaining portions of the inlet and outlet and cooperate with the mould portions 442a and 442b to form the other edge sides 28a and 28b thereby securing the filter element 50 to the housing 22 avoiding the need for additional seals.

FIG. 15a illustrates the parison positioned into the cavities of the moulds 442a and 442b. The axially movable mould portion 444a has not been advanced to engage the parison. FIG. 15b shows the mould portion 444a in place deforming the parison to form the edge 28a. While not shown, the action of the other mould portion 444b is similar to that described above.

Subsequently after cooling, the now formed air cleaner 20 is ready to be removed from the machine 300. Removal may be achieved by retracting the robot arm 400 and holder 412 through the lower end 420 of the air cleaner prior to opening the mould. After removal of the air cleaner from the machine 300, the surplusage is removed by cutting along the cut lines 322.

FIGS. 16 and 17 diagrammatically illustrate an alternate method of making an air cleaner in accordance with the present invention. Positioned centrally below the extrusion die 302 is a robot arm 308 having a clamp 306 disposed at one end thereof. The arm 308 and/or clamp 306 may be pivoted to allow the filter element 50 to move. Prior to extruding the parison the filter element 50 is inserted into the clamp 306. The air cleaner element 50 may be positioned such that the clamp 306 engages the extending tab 74 of the filter 50. FIG. 16 illustrates the filter 50 hanging from the clamp 306 within a cylindrically shaped parison 304 of sufficient length. The machine 300 includes a multi-part mould having a plurality of movable portions such as the radially moving portions 312a and 312b and the axially movable portions 314a and 314b which are not illustrated in FIG. 16. With the filter 50 held in place the mould portions 312a and 312b are moved together. Thereafter, the axially movable mould portions 314a and 314b are slid into place forming the configuration illustrated in FIG. 17. In this configuration, the moulds will orient the filter element 50 along opposing separation line 316 of the moulds. Simultaneously, with the closing of the various mould portions an air injection pin 320 is moved upwardly such that one end extends into the moulded cavity. Pressurized air is communicated to the injection pin to blow the unformed parison into the various mould cavities. Upon cooling of the now formed parison, the mould portions and injection pin 320 are retracted and the now formed air cleaner is removed from the machine. The respective inlets and outlets may be formed by cutting the air cleaner along the cut lines illustrated as 322.

The various mould portions 312 and 314 are shaped such that the above mentioned integrally formed circumferential edge 28 is formed about the air cleaner thereby permanently securing the air filter element 50 thereto. In this manner, the air filter element 50 is permanently attached and sealed to the housing thereby avoiding the need for additional seals. Upon removal of the now formed air cleaner 20 the extending tab 74 is similarly removed such as by cutting, or tearing along a perforated line 75. The tab 74 with a perforation line near is not to allow for easy removal.

Many changes and modifications in the above described embodiment of the invention can, of course, be carried out without departing from the scope thereof. Accordingly, that scope is intended to be limited only by the scope of the appended claims.

I claim:
1. An air cleaner comprising:
a single piece blow moulded housing comprising a central chamber and an inlet and an outlet communicated thereto,
an air filter element dividing the central chamber into first and second compartments in communication with the inlet and secured to the housing during the moulding thereof.

2. The air cleaner as defined in claim 1 wherein the filter element includes an active area for filtering air and a non-active area comprising a circumferential edge sealingly engaged by a circumferential edge of the housing.

3. The device as defined in claim 2 wherein the outlet is elevated relative to the inlet.

4. The device as defined in claim 3 wherein the inlet extends substantially axially from the housing and wherein the filter element is disposed at an angle relative to the incoming air flow.

5. The device as defined in claim 4 wherein a downstream surface of the filter element is covered by a fibrous material to prevent large dirt particles from flowing into upstream areas of the filter element and wherein such particles tend to fall therefrom and become lodged in a narrow downstream end of the second compartment.

6. The air cleaner as defined in claim 2 wherein the housing is aerodynamically profiled to reduce turbulance and increase the uniformity of flow through the element wherein the cross-section area across the first and second compartments is substantial constant along the axial dimension of the filter element.

7. The air cleaner as defined in claim 2 wherein the cross-section flow area of the second housing compartment decreases from the inlet to a first end, proximate the outlet and the cross-section of the first housing compartment increases from a first end, proximate the inlet to the outlet.

8. The air cleaner as defined in claim 7 wherein the housing comprises accurately shaped upper and lower portions integrally joined about an extending edge of the filter element.

9. The air cleaner as defined in claim 7 further including an orifice positioned within the inlet.

10. An air cleaner comprising:
a one piece, moulded housing, including domed first and second member integrally formed about a common circumferential first joint or edge, defining therein a chamber, an inlet and an outlet extending therefrom in communication with the chamber,
filter means secured within the housing, during the moulding thereof, at the common edge for dividing the chamber into first and second compartments in communication with the inlet and outlet respectively.

11. The device as defined in claim 10 wherein the cross-sectional area, of various cross-sections, taken perpendicularly to a longitudinal axis are substantially equal.

12. The device as defined in claim 10 wherein the height of the first compartment, measured from the inside of the first housing member to a plane containing the first edge increases from the inlet to the outlet and the height of the second compartment, measured from the inside of the second housing member to the plane, decreases from the inlet to the outlet.

13. The device as defined in claim 12 wherein the plane of the first edge is generally angled relative to the inlet and outlet.

14. The device as defined in claim 13 wherein the outlet is positioned above the inlet such that air received at the inlet will flow up through the filter element and exit through the outlet.

15. The device as defined in claim 10 wherein the filter is rectangular including a thin circumferential second edge thereabout secured within the first edge, the first edge comprising a first pair of opposing first and second sides and a second pair of opposed sides.

16. The device as defined first in claim 15 wherein the second housing member comprises end surface, defining the inlet, connected integrally to a first side of the first edge, an outer portion, forward of the first end surface and tapering downwardly from proximate the inlet to the second side and downwardly toward the third and fourth sides;

the first housing portion comprising a second end surface, defining the outlet, connected integrally to the second side, a top surface, rearward of the second end, tapering from proximate the outlet to the first side and downward toward the third and fourth sides.

17. The device as defined in claim 16 wherein the inlet includes an orifice.

18. A method of making an air cleaner comprising a one-piece hollow housing and a filter element secured therein within a blow moulding machine comprising shaped, movable moulds, comprising the steps of:
(a) securing a preformed filter element in a preferred orientation,
(b) forming an open ended cylindrically shaped parison of a mouldable material,
(c) closing moulds about the parison and filter element,
(d) blowing the parison into mould cavities, one of which is located about the filter element thereby securing the filter element in place.

19. The method as defined in claim 18 wherein the filter element includes a thin circumferential edge and wherein the moulds define a circumferential edge cavity and wherein the step of closing includes forming the parison tightly about the circumferential edge.

20. The method as defined in claim 19 wherein the circumferential edge includes a tab extending therefrom, and wherein the moulding machine includes a clamping mechanism positioned within the parison wherein the step of orienting includes inserting the tab into the clamping mechanism and orienting the filter element relative to the moulds and wherein the step of forming includes forming the parison about the circumferential edge with the exception of the extending tab.

21. The method as defined in claim 20 further including the steps of removing the now formed air cleaner from the machine and removing the portion of the tab which extends therefrom.

22. The method as defined in claim 19 wherein the machine includes a movable arm movable relative to the parison and a filter holder extending therefrom, including means for engaging and orienting the filter element at a preferred orientation relative to the moulds, wherein the step of orienting includes securing the filter element to the filter holder.

* * * * *